United States Patent
Hsieh et al.

(10) Patent No.: US 9,019,601 B2
(45) Date of Patent: Apr. 28, 2015

(54) LIGHT HARVESTING LENS MODULE

(75) Inventors: Wei-Che Hsieh, Taipei (TW); Allen Jong-Woei Whang, Taipei (TW); Yi-Yung Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 876 days.

(21) Appl. No.: 13/240,235

(22) Filed: Sep. 22, 2011

(65) Prior Publication Data
US 2013/0027949 A1 Jan. 31, 2013

(30) Foreign Application Priority Data
Jul. 28, 2011 (TW) .............................. 100126816 A (51) Int. Cl.
G02B 3/08 (2006.01)
F21S 11/00 (2006.01)

(52) U.S. Cl.
CPC ... *G02B 3/08* (2013.01); *F21S 11/00* (2013.01)

(58) Field of Classification Search
USPC ................... 362/327; 359/387, 664; 136/246; 52/200
See application file for complete search history.

(56) References Cited

U.S. PATENT DOCUMENTS

| | | | | | |
|---|---|---|---|---|---|
| 4,411,490 | A | * | 10/1983 | Daniel | 126/648 |
| 5,404,869 | A | * | 4/1995 | Parkyn et al. | 126/699 |
| 5,408,795 | A | * | 4/1995 | Eljadi et al. | 52/173.3 |
| 5,577,492 | A | * | 11/1996 | Parkyn et al. | 126/698 |
| 5,897,201 | A | * | 4/1999 | Simon | 362/268 |
| 7,620,309 | B2 | * | 11/2009 | Georgiev | 396/113 |
| 7,806,547 | B2 | * | 10/2010 | Benitez et al. | 362/97.3 |
| 8,767,302 | B2 | * | 7/2014 | Whang et al. | 359/592 |
| 2005/0088758 | A1 | * | 4/2005 | Minano et al. | 359/726 |
| 2005/0117125 | A1 | * | 6/2005 | Minano et al. | 353/81 |
| 2008/0037116 | A1 | * | 2/2008 | Alasaarela et al. | 359/433 |
| 2010/0224232 | A1 | * | 9/2010 | Cummings et al. | 136/246 |
| 2011/0019404 | A1 | * | 1/2011 | Chien et al. | 362/235 |

* cited by examiner

*Primary Examiner* — Mary McManmon
(74) *Attorney, Agent, or Firm* — Bacon & Thomas, PLLC (57) ABSTRACT

A light harvesting lens module for collecting an ambient light includes a plurality of annular lenses. The annular lenses are arranged in order from center to outside to form a disc-structure. Each annular lens has a light-input curved surface and a light-output curved surface. The light-input curved surface is in opposition to the center. The light-output curved surface is in opposition to the light-input curved surface, and faces the center. The light is incident on the light-input curved surface, and is refracted and tend to concentrate by the light-input curved surface. Then, the light is emitted from the annular lens, and is refracted to the direction of the center by the light-output curved surface. The ambient light is able to be compressed into a point light by the lens module, so as to increase the concentration ratio and the compression ratio to further get the effective advantage.

7 Claims, 8 Drawing Sheets

LIGHT HARVESTING LENS MODULE

BACKGROUND OF THE INVENTION (1) Field of the Invention

The invention relates to a light harvesting module, and especially relates to a light harvesting lens module for converging an ambient light on a point to form a light source, to improve the effective utilization of the ambient light.

(2) Description of the Prior Art

In recent year, environment conversation issues have paid more attention to make green energy became a new industry trends as the progressing of technology and the increasing of energy demand. Therefore, how to extra efficient advantage of renewable energy is an important issue. Particularly, it aims to the problem of applying green energy into architecture industry for providing natural light but saving the building energy consumption at the same time. Wherein the building energy consumption includes air conditioner, illumination and household electricity, etc. The energy consumption of illumination takes a fifth of the building energy consumption. Thus, saving the energy consumption of the illumination will be the most important item of energy-saved developments in the architecture industry.

In the architecture industry, the illumination is provided as following: one is utilizing solar energy conversion technology to provide electricity by optic-electric conversion, but the conversion efficiency and the cost should be considered; another one is utilizing optical design for directly leading the solar light into the interior building so as to form a green illumination and to substantially increase the effective utilization of solar energy. By means of harvesting solar light, the solar light is guided into the interior building such as office, house, hallway, basement and etc., and is utilized as an auxiliary illumination, to decrease the energy consumption. The solar light is collected by a light harvesting device, and is guided into the interior building by a light guiding device. Moreover, the light harvesting device is applied in solar energy system, for increasing the light collection efficiency to gain the conversion efficiency.

Though, the green illumination can directly lead the solar light into the interior building, the light energy must be wasted in the processing of light collection, light transmission and light illumination. Therefore, how to increase the concentration ratio and the compression ratio of the light harvesting device is the question urgently need to be solved in this field.

SUMMARY OF THE INVENTION

Accordingly, the object of the invention is to provide a light harvesting lens module for increasing the concentration ratio and the compression ratio to further get the effective advantage from the ambient light.

In one aspect, the invention provides a light harvesting lens module includes at a least annular lens, and the annular lens has a center and includes a light-input curved surface, a light-output curved surface and a reflection surface. The light-input curved surface is disposed in opposition to the center. The light-output curved surface is disposed in opposition to the light-input curved surface and faces the center. A light beam is incident on the light-input curved surface, and is refracted and tend to concentrate by the light-input curved surface. Then, the light beam is emitted from the annular lens via the light-output curved surface, and is refracted to the direction of the center by the light-output curved surface. The reflection surface is disposed between the light-input curved surface and the light-output curved surface, and is connected between a side of the light-input curved surface and a side of the light-output curved surface. The light beam is reflected by the reflection surface and is emitted to the direction of the center.

In an embodiment, the light harvesting lens module further includes a flat surface disposed in opposition to the reflection surface, and the flat surface is connected between another side of the light-input curved surface and another side of the light-output curved surface. Especially, the light-output curved surface is a depression surface.

In another embodiment, the light-output curved surface is a protruding surface, and the flat surface has a reflection area. The light-input curved surface has a light-input focus, and the light-input focus is disposed on the reflection area, wherein the light beam is focused on the light-input focus by the light-input curved surface and is reflected by the reflection area. The light-output curved surface has a light-output focus, and the light-output focus and the light-output focus are in the same position, so the light beam focused on the light-output focus is reflected to the light-output curved surface by the reflection area.

In another embodiment, the light harvesting lens module further includes a light guiding unit disposed on the center for guiding the light beam emitted from the light-output curved surface.

In another embodiment, the annular lens is plural, the radii of the annular lenses are different, so the annular lenses are arranged in order from center to outside to form a disc-structure.

In another embodiment, the annular lenses include a first annular lens and a second annular lens, the first annular lens has a first light-input curved surface and a first light-output curved surface, the first light-output curved surface faces the center and the first light-input curved surface is disposed in opposition to the first light-output curved surface, the second annular lens has a second light-input curved surface and a second light-output curved surface, the second light-output curved surface faces the first light-input curved surface and the second light-input curved surface is disposed in opposition to the second light-output curved surface. Especially, the first light-input curved surface and the second light-input curved surface are protruding surfaces, and the first light-output curved surface and the second light-output curved surface are depression surfaces.

In another embodiment, said first light-input curved surface, said second light-input curved surface, said first light-output curved surface and said second light-output curved surface are protruding surfaces. The first light-input curved surface and the first light-output curved surface have a first focus in common, and the second light-input curved surface and the second light-output curved surface have a second focus in common. The light beam focused on the second focus is reflected to the second light-output curved surface, and is refracted to the first light-input curved surface by the second light-output curved surface. Then, the light beam is refracted by the first light-input curved surface so is focused on the first focus. Afterward, the light beam is reflected to the first light-output curved surface, and is refracted by the first light-output curved surface and is emitted to the direction of the center.

Compared to the conventional light harvesting lens module, the advantages of the light harvesting lens module of the invention are the smaller light harvesting space, the higher compression ratio and etc., so as to improve the concentration ratio and to get the effective advantage of the ambient light.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the FIGure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
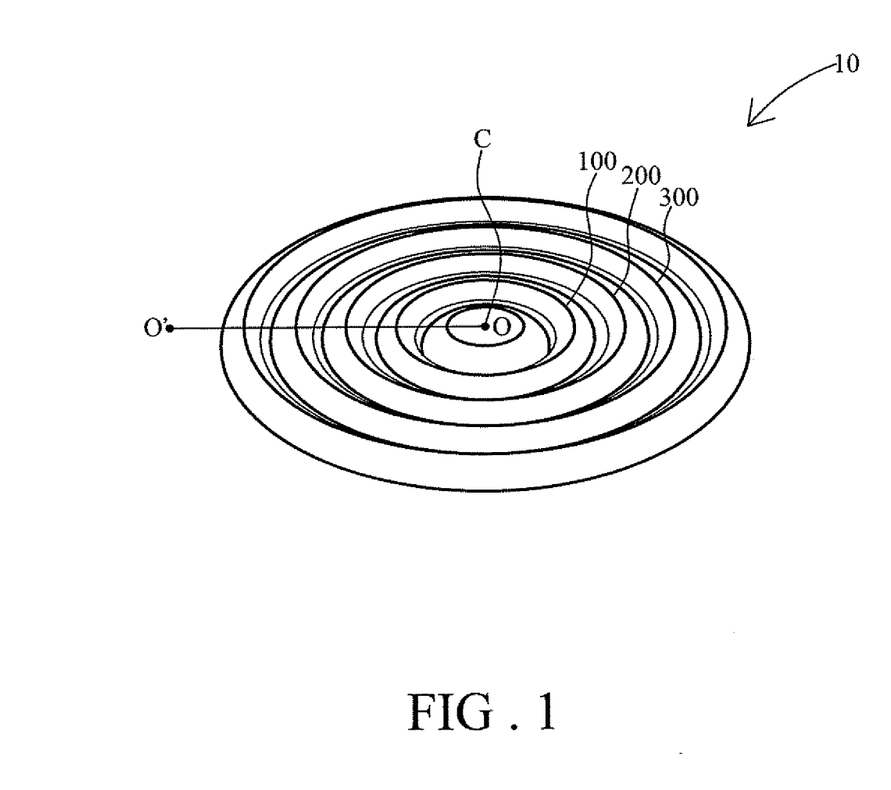
FIG. 1 is an elevation view of the light harvesting lens module of a first embodiment.

Refer to FIG. 1 for an elevation view of a light harvesting lens module of the first embodiment according to the invention. The light harvesting lens module 10 includes a plurality of annular lenses 100, 200, 300, used to converge an ambient light on a point to form a point source. The radii of the annular lenses 100, 200, 300 are different, so the annular lenses 100, 200, 300 are arranged in order from a center C to outside to form a disc-structure of the light harvesting lens module 10.

Figure 2:
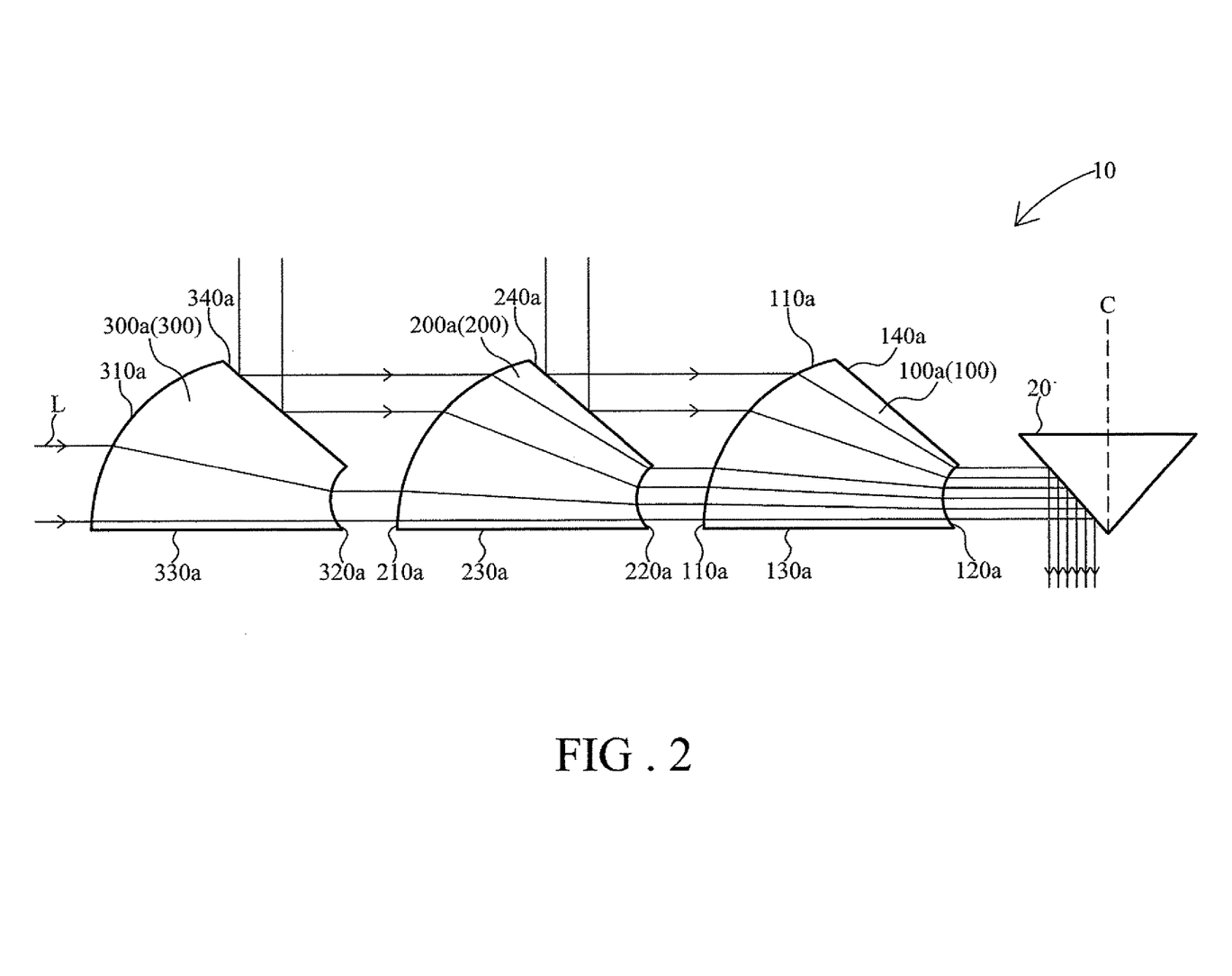
FIG. 2 is a partially sectional view of the light harvesting lens module in FIG. 1 cut along the external line O-O'.

Refer to FIG. 2 for a partially sectional view of the light harvesting lens module in FIG. 1 cut along the external line O-O'. In the first embodiment, the section of the light harvesting lens module 10 includes a section of a first annular lens 100a, a section of a second annular lens 200a and a section of a third annular lens 300a.

The surface of the first annular lens 100 includes a first light-input curved surface 110a, a first light-output curved surface 120a, a first flat surface 130a and a first reflection surface 140a. The first light-input curved surface 110a is disposed at the outside of the first annular lens 100 and in opposition to the center C. The first light-output curved surface 120a is disposed in opposition to the first light-input curved surface 110a and at the inside of the first annular lens 100, and faces the center C. The first light-output curved surface 120a is a depression surface. The first flat surface 130a is disposed between the first light-input curved surface 110a and the first light-output curved surface 120a, and is connected between a side of the first light-input curved surface 110a and a side of the first light-output curved surface 120a. The first reflection surface 140a is disposed in opposition to the first flat surface 130a, and is connected between another side of the first light-input curved surface 110a and another side of the first light-output curved surface 120a. Wherein the first light-input curved surface 110a and the first light-output curved surface 120a are able to be non-spherical surfaces.

The radius of the second annular lens 200 is larger than the radius of the first annular lens 100, so the first annular lens 100 is surrounded by the second annular lens 200. The surface of the second annular lens 200 includes a second light-input curved surface 210a, a second light-output curved surface 220a, a second flat surface 230a and a second reflection surface 240a. The second light-input curved surface 210a is disposed at the outside of the second annular lens 200 and in opposition to the center C. The second light-output curved surface 220a is disposed in opposition to the second light-input curved surface 210a and at the inside of the second annular lens 200, and faces the center C. The second light-output curved surface 220a is a depression surface. The second flat surface 230a is disposed between the second light-input curved surface 210a and the second light-output curved surface 220a, and is connected between a side of the second light-input curved surface 210a and a side of the second light-output curved surface 220a. The second reflection surface 240a is disposed in opposition to the second flat surface 230a, and is connected between another side of the second light-input curved surface 210a and another side of the second light-output curved surface 220a. Wherein the second light-input curved surface 210a and the second light-output curved surface 220a are able to be non-spherical surfaces.

The radius of the third annular lens 300 is larger than the radius of the second annular lens 200, so the second annular lens 200 is surrounded by the third annular lens 300. The surface of the third annular lens 300 includes a third light-input curved surface 310a, a third light-output curved surface 320a, a third flat surface 330a and a third reflection surface 340a. The third light-input curved surface 310a is disposed at the outside of the third annular lens 300 and in opposition to the center C. The third light-output curved surface 320a is disposed in opposition to the third light-input curved surface 310a and at the inside of the third annular lens 300, and faces the center C. The third light-output curved surface 320a is a depression surface. The third flat surface 330a is disposed between the third light-input curved surface 310a and the third light-output curved surface 320a, and is connected between a side of the third light-input curved surface 310a and a side of the third light-output curved surface 320a. The third reflection surface 340a is disposed in opposition to the third flat surface 330a, and is connected between another side of the third light-input curved surface 310a and another side of the third light-output curved surface 320a. Wherein the third light-input curved surface 310a and the third light-output curved surface 320a are able to be non-spherical surfaces.

The path of converging an ambient light beam L is described as below. The light beam L is reflected to the second light-input curved surface 210a by the third reflection surface 340a, and then is refracted to the second light-output curved surface 220a by the second light-input curved surface 210a. Afterward, the light beam L is refracted by the second light-output curved surface 220a and is emitted from the second annular lens 200 so as to be parallel incident to the first light-input curved surface 110a. Meanwhile, the light beam L is reflected to the first light-input curved surface 110a by the second reflection surface 240a. The light beam L is refracted to the first light-output curved surface 120a by the first light-input curved surface 110a, and then is refracted by the first light-output curved surface 120a and is emitted from the first annular lens 100 to be parallel incident to an axis of the center C.

Otherwise, the third annular lens 300 is surrounded by a fourth annular lens (without drawn). The light beam L is reflected by a fourth reflection surface (without drawn) of the fourth annular lens to guide to the third light-output curved surface 310a. Afterward, the light beam L is refracted by the third light-output curved surface 320a and is emitted from the third annular lens 300 to be parallel incident to the second light-input curved surface 210a, so as to harvest the more light beam L by the light harvesting lens module 10.

In an embodiment, a light guiding unit 20 is disposed on the center C, for example, a fiber with a cone structure. The light beam L emitted from the first light-output curved surface 120a is incident to the light guiding unit 20 so as to be used for interior illumination, solar energy system, and etc.

By the arrangement of the first annular lens 100, the second annular lens 200 and the third annular lens 300 and the disc-structure thereof, the light beam is gradually converged via the outermost third annular lens 300 to the innermost first annular lens 100 on the center C. Therefore, the ambient light beam is converged on a point to form the point source by the light harvesting lens module 10, for increasing the compression ratio and for obtaining the effective advantage.

Figure 3:
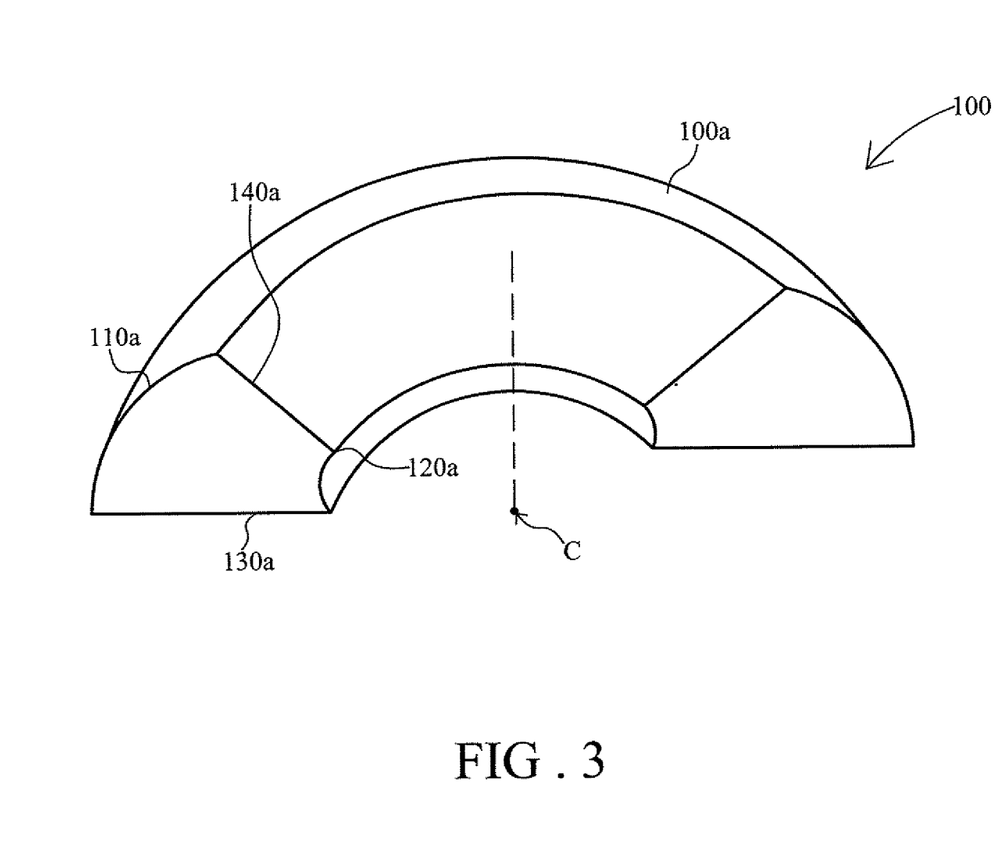
FIGS. 3 and 4 are respectively an sectional elevation view and a sectional view of the light harvesting lens module of a second embodiment.

Refer to FIG. 3 for an sectional elevation view of the light harvesting lens module of a second embodiment according to the invention. The light harvesting lens module of the second embodiment only includes an annular lens 100. A center C is surrounded by the annular lens 100, and an axis of the center C is shown as the dotted line. The surface of the annular lens 100 includes a light-input curved surface 110a, a light-output curved surface 120a, a flat surface 130a and a reflection surface 140a, wherein the light-input curved surface 110a and the light-output curved surface 120a are able to be non-spherical surfaces. The light-input curved surface 110a is a protruding surface and is disposed at the outside of the annular lens 100 and in opposition to the center C. The light-output curved surface 120a is a depression surface, and is disposed in opposition to the light-input curved surface 110a and at the inside of the annular lens 100, and faces the center C. The flat surface 130a is disposed between the light-input curved surface 110a and the light-output curved surface 120a, and is connected between a side of the light-input curved surface 110a and a side of the light-output curved surface 120a. The reflection surface 140a is disposed in opposition to the flat surface 130a, and is connected between another side of the light-input curved surface 110a and another side of the light-output curved surface 120a.

Figure 4:
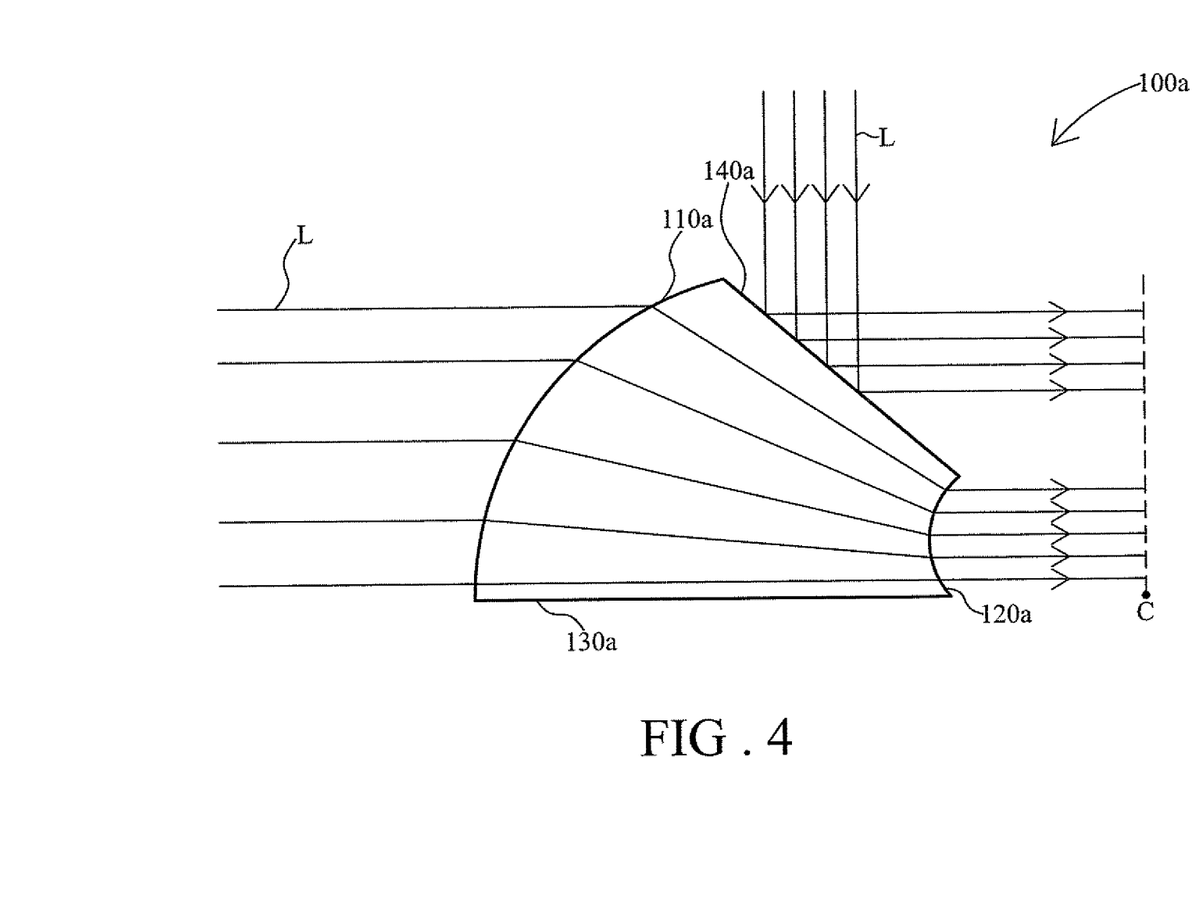

By the annular lens 100 for harvesting the ambient light beam L, the path of the light beam L is shown as FIG. 4. A part of the light beam L is incident to the light-input curved surface 110a and is refracted to the light-output curved surface 120a by the light-input curved surface 110a. Afterward, the part of the light beam L is refracted by the light-output curved surface 120a and is emitted from the annular lens 100 to be parallel incident to the axis of the center C. Another part of the light beam L is reflected by the reflection surface 140a and is incident to the axis of the center C.

Figure 5:
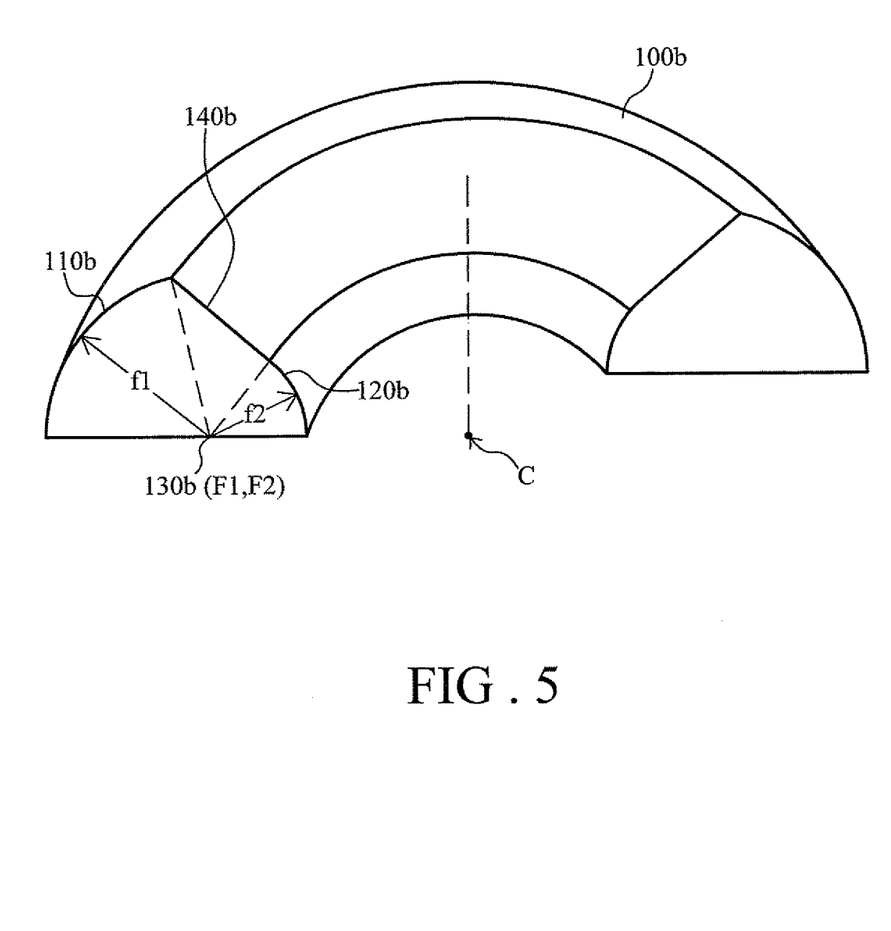
FIGS. 5 and 6 are respectively an sectional elevation view and a sectional view of the light harvesting lens module of a third embodiment.

Refer to FIG. 5 for an sectional elevation view of the light harvesting lens module of a third embodiment according to the invention. The light harvesting lens module of the third embodiment only includes an annular lens 100b and has a center C. An axis of the center C is shown as the dotted line. The surface of the annular lens 100b includes a light-input curved surface 110b, a light-output curved surface 120b, a flat surface 130b and a reflection surface 140b, wherein the light-input curved surface 110b and the light-output curved surface 120b are protruding surfaces.

The light-input curved surface 110b is disposed at the outside of the annular lens 100b and in opposition to the center C. The light-input curved surface 110b is able to be a non-spherical surface and has a light-input focus F1. The distance between the light-input curved surface 110b and the light-input focus F1 is a light-input focal length f1. The light-output curved surface 120b is disposed in opposition to the light-input curved surface 110b and at the inside of the annular lens 100b, and faces the center C. The light-output curved surface 120b is able to be a non-spherical surface and has a light-output focus F2. The distance between the light-output curved surface 120b and the light-output focus F2 is a light-output focal length f2. Especially, the light-input focus F1 and the light-output focus F2 are in the same position, which are con-focal.

The flat surface 130b is disposed between the light-input curved surface 110b and the light-output curved surface 120b, and is connected between a side of the light-input curved surface 110b and a side of the light-output curved surface 120b. Especially, the flat surface 130b includes a reflection area (without label), and the light-input focus F1 and the light-output focus F2 are disposed inside the reflection area. The reflection surface 140b is disposed in opposition to the flat surface 130b, and is connected between another side of the light-input curved surface 110b and another side of the light-output curved surface 120b.

Figure 6:
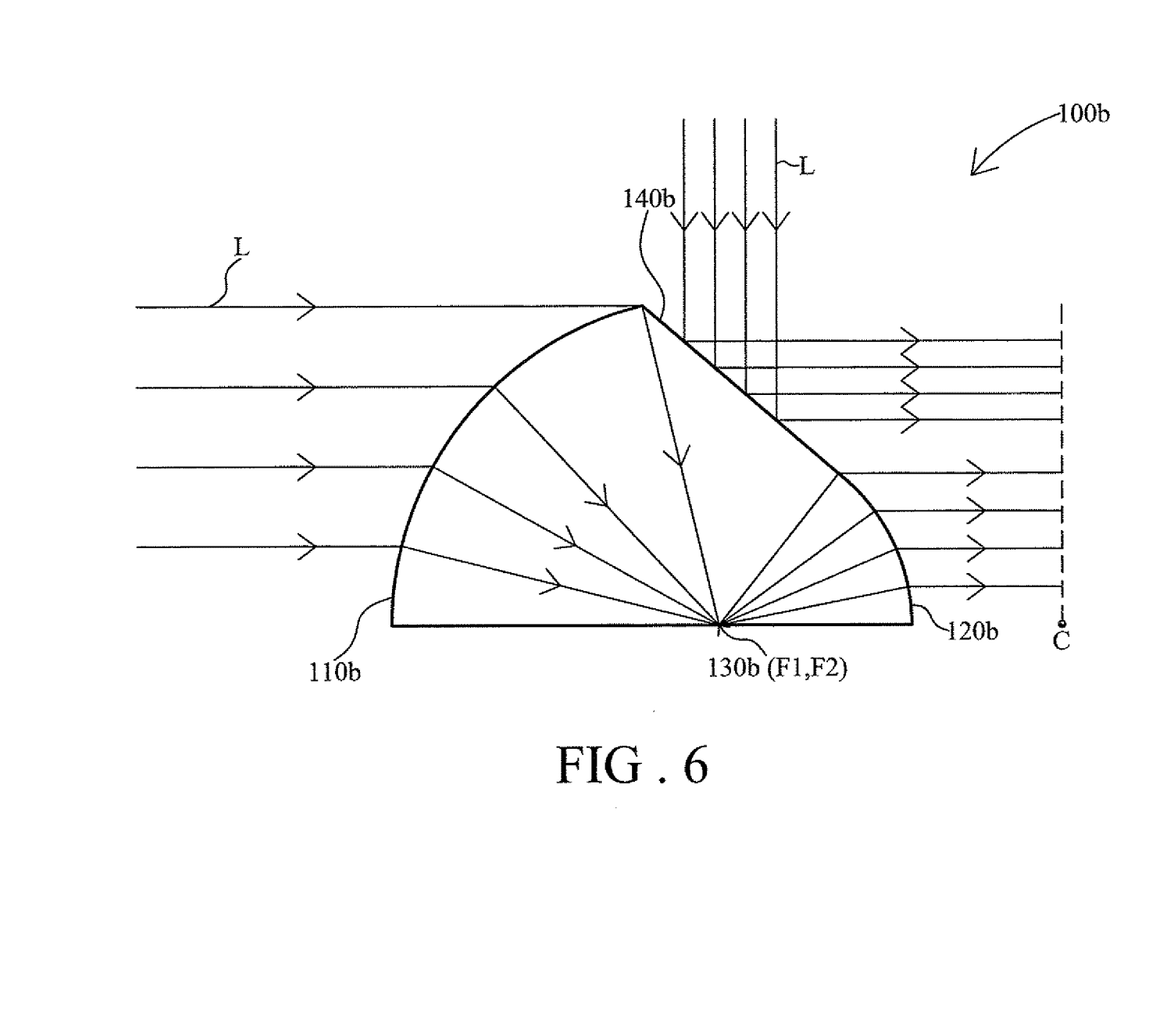

By the annular lens 100b for harvesting the ambient light beam L, the path of the light beam L is shown as FIG. 6. A part of the light beam L is incident to the light-input curved surface 110b and is focused on the light-input focus F1 by the light-input curved surface 110b. For the light-input focus F1 disposed on the reflection area of the flat surface 130 and in the same position of the light-output focus F2, the part of light beam L from the light-input curved surface 110b is reflected to the light-output curved surface 120b. Afterward, the part of the light beam L is refracted by the light-output curved surface 120b and is emitted from the annular lens 100b to be parallel incident to the axis of the center C. Another part of the light beam L is reflected by the reflection surface 140b and is incident to the axis of the center C.

The light guiding unit is able to be disposed on the axis of the center in said embodiment of FIGS. 3-6. Therefore, the light beam L, emitted from the light-output curved surfaces 120a and 120b and reflected by the reflection surfaces 140a and 140b, is incident to the light guiding unit.

By means of the shape of the annular lens 100 formed by the non-spherical surfaces 110a and 120a, the ambient light beam is focused on a point by the annular lens 100, to form the point source applied for interior illumination, solar energy system, and etc.

Figure 7:
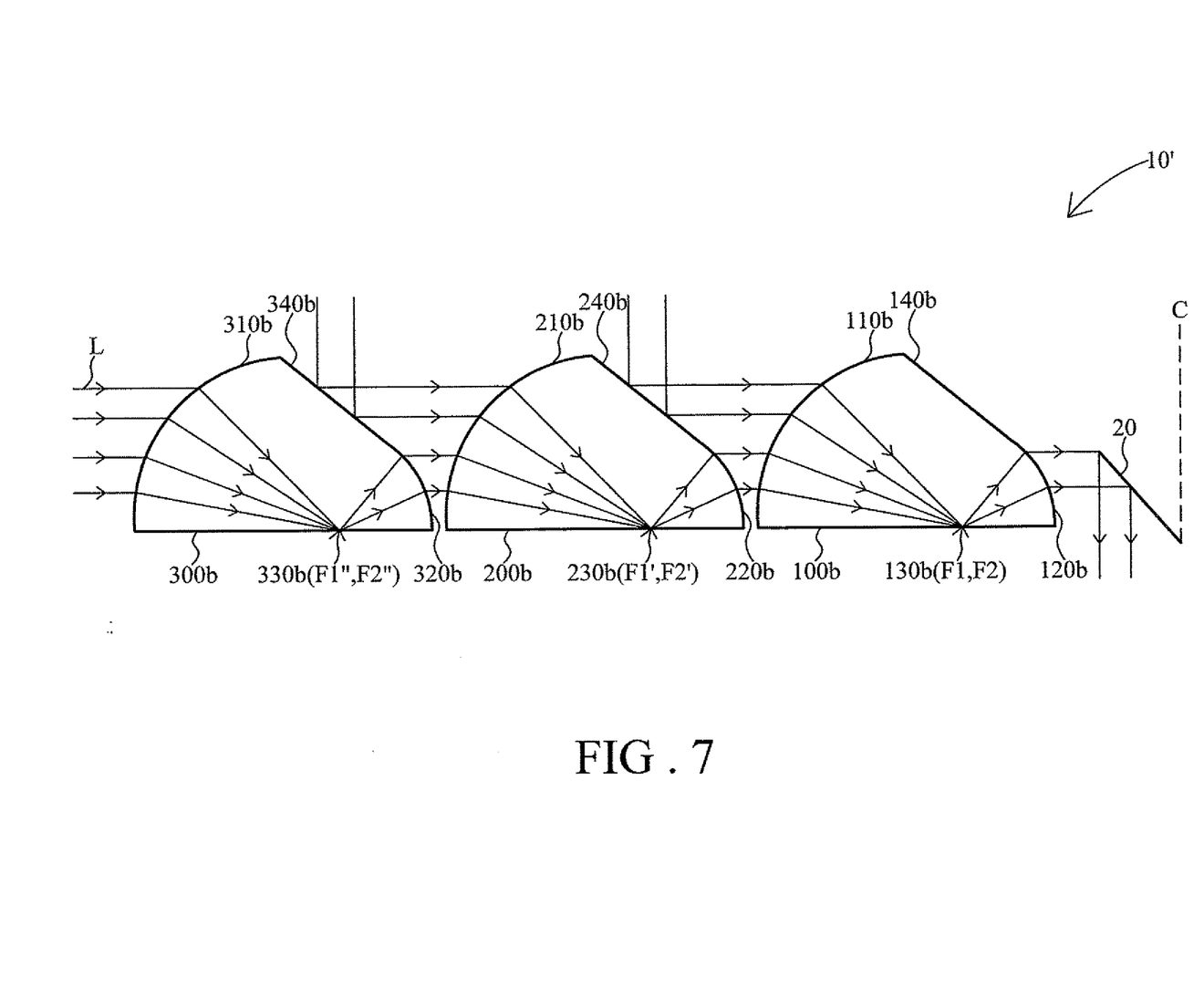
FIG. 7 is a sectional view of the light harvesting lens module of a fourth embodiment.

Refer to FIG. 7, the light harvesting lens module 10' of a fourth embodiment is composed of a plurality of annular lens 100*b* as shown in FIGS. 5 and 6, and the annular lenses 100*b* are arranged in order to form a disc-structure of the light harvesting lens module 10'.

The surface of a first annular lens 100*b* includes a first light-input curved surface 110*b*, a first light-output curved surface 120*b*, a first flat surface 130*b* and a first reflection surface 140*b*. The first light-input curved surface 110*b* is a protruding surface, and is disposed at the outside of the first annular lens 100*b* and in opposition to the center C. The first light-input curved surface 110*b* has a first light-input focus F1. The first light-output curved surface 120*b* is a protruding surface, is disposed in opposition to the first light-input curved surface 110*b* and at the inside of the first annular lens 100*b*, and faces the center C. The first light-output curved surface 120*b* has a second light-output focus F2. Wherein the first light-input focus F1 and the first light-output focus F2 are con-focal and disposed on a reflection area (without label) of the first flat surface 130*b*. The first flat surface 130*b* is disposed between the first light-input curved surface 110*b* and the first light-output curved surface 120*b*, and is connected between a side of the first light-input curved surface 110*b* and a side of the first light-output curved surface 120*b*. The first reflection surface 140*b* is disposed in opposition to the first flat surface 130*b*, and is connected between another side of the first light-input curved surface 110*b* and another side of the first light-output curved surface 120*b*. In an embodiment, the distance between the first light-input focus F1 and the centre C is defined as a radius of the first annular lens 100*b*.

The radius of the second annular lens 200*b* is larger than the radius of the first annular lens 100*b*, so the first annular lens 100*b* is surrounded by the second annular lens 200*b*. The surface of the second annular lens 200*b* includes a second light-input curved surface 210*b*, a second light-output curved surface 220*b*, a second flat surface 230*b* and a second reflection surface 240*b*. The second light-input curved surface 210*b* is disposed at the outside of the second annular lens 200*b* and in opposition to the center C. The second light-input curved surface 210*b* has a second light-input focus F1'. The second light-output curved surface 220*b* is a protruding surface, is disposed in opposition to the second light-input curved surface 210*b* and at the inside of the second annular lens 200*b*, and faces the center C. The second light-output curved surface 220*a* has a second light-output focus F2'. Wherein the second light-input focus F1' and the second light-output focus F2' are con-focal and are disposed on a reflection area (without label) of the second flat surface 230*b*. The distance between the second light-input focus F1' and the centre C is the radius of the second annular lens 200*b*. The second flat surface 230*b* is disposed between the second light-input curved surface 210 and the second light-output curved surface 220*b*, and is connected between a side of the second light-input curved surface 210*b* and a side of the second light-output curved surface 220*b*. The second reflection surface 240*b* is disposed in opposition to the second flat surface 230*b*, and is connected between another side of the second light-input curved surface 210*b* and another side of the second light-output curved surface 220*b*.

The radius of the third annular lens 300*b* is larger than the radius of the second annular lens 200*b*, so the second annular lens 200*b* is surrounded by the third annular lens 300*b*. The surface of the third annular lens 300*b* includes a third light-input curved surface 310*b*, a third light-output curved surface 320*b*, a third flat surface 330*b* and a third reflection surface 340*b*. The third light-input curved surface 310 is disposed at the outside of the third annular lens 300*b* and in opposition to the center C. The third light-input curved surface 310*b* has a third light-input focus F1". The third light-output curved surface 320*b* is a protruding surface, is disposed in opposition to the third light-input curved surface 310*b* and at the inside of the third annular lens 300*b*, and faces the center C. The third light-output curved surface 320*b* has a third light-output focus F2". Wherein the third light-input focus F1" and the third light-output focus F2" are con-focal and are disposed on a reflection area (without label) of the third flat surface 330*b*. The third flat surface 330*b* is disposed between the third light-input curved surface 310*b* and the third light-output curved surface 320*b*, and is connected between a side of the third light-input curved surface 310*b* and a side of the third light-output curved surface 320*b*. The third reflection surface 340*b* is disposed in opposition to the third flat surface 330*b*, and is connected between another side of the third light-input curved surface 310*b* and another side of the third light-output curved surface 320*b*.

In an embodiment, the distance between the third light-input focus F1" and the centre C is defined as a radius of the third annular lens 300*b*. The first annular lens 100*b*, the second annular lens 200*b* and the third annular lens 300*b* are arranged in order from the center C to outside to form the disc-structure of the light harvesting lens module 10'.

When the light beam L is incident to the third annular lens 300*b*, the light beam L is reflected to the second light-input curved surface 210*b* by the third reflection surface 340*b*. Afterwards, the light beam L is refracted to the second flat surface 230*b* by the second light-input curved surface 210*b*, and is reflected to the second light-output curved surface 220*b* by the reflection area of the second flat surface 230*b*. The light beam L is refracted by the second light-output curved surface 220*b* and is emitted from the second annular lens 200*b* so as to be parallel incident to the first light-input curved surface 110*b*. Meanwhile, the light beam L is reflected to the first light-input curved surface 110*b* by the second reflection surface 240*b*. The light beam L is refracted to the first flat surface 130*b* by the first light-input curved surface 110*b*, and then is reflected to the first light-output curved surface 120*b* by the reflection area of the first flat surface 130*b*. The light beam L is refracted by the first light-output curved surface 120*b* and is emitted from the first annular lens 100*b* to be parallel incident to the axis of the center C.

Otherwise, the third annular lens 300*b* is surrounded by a fourth annular lens (without drawn). The light beam L is reflected to the third light-input curved surface 310*b* by a fourth reflection surface (without drawn) of the fourth annular lens, and is refracted to the third flat surface 330*b* by the third light-input curved surface 310*b*. Then, the light beam L is reflected to the third light-output curved surface 320*b* by the reflection area of the third flat surface 330*b*. Afterward, the light beam L is refracted by the third light-output curved surface 320*b* and is emitted from the third annular lens 300*b* to be parallel incident to the second light-input curved surface 210*b*, so the more light beam L is collected by the light harvesting lens module 10'. In an embodiment, a light guiding unit 20 is disposed on the center C, and the light beam L is guided to be applied for interior illumination, solar energy system, and etc. by the light guiding unit 20.

By the arrangement of the first annular lens 100*b*, the second annular lens 200*b* and the third annular lens 300*b* and the disc-structure thereof, the light beam is gradually converged via the outermost third annular lens 300*b* to the innermost first annular lens 100*b* on the center C. Therefore, the ambient light beam is converged on a point to form the point source by the light harvesting lens module 10', for increasing the compression ratio and for obtaining the effective advantage.

Figure 8:
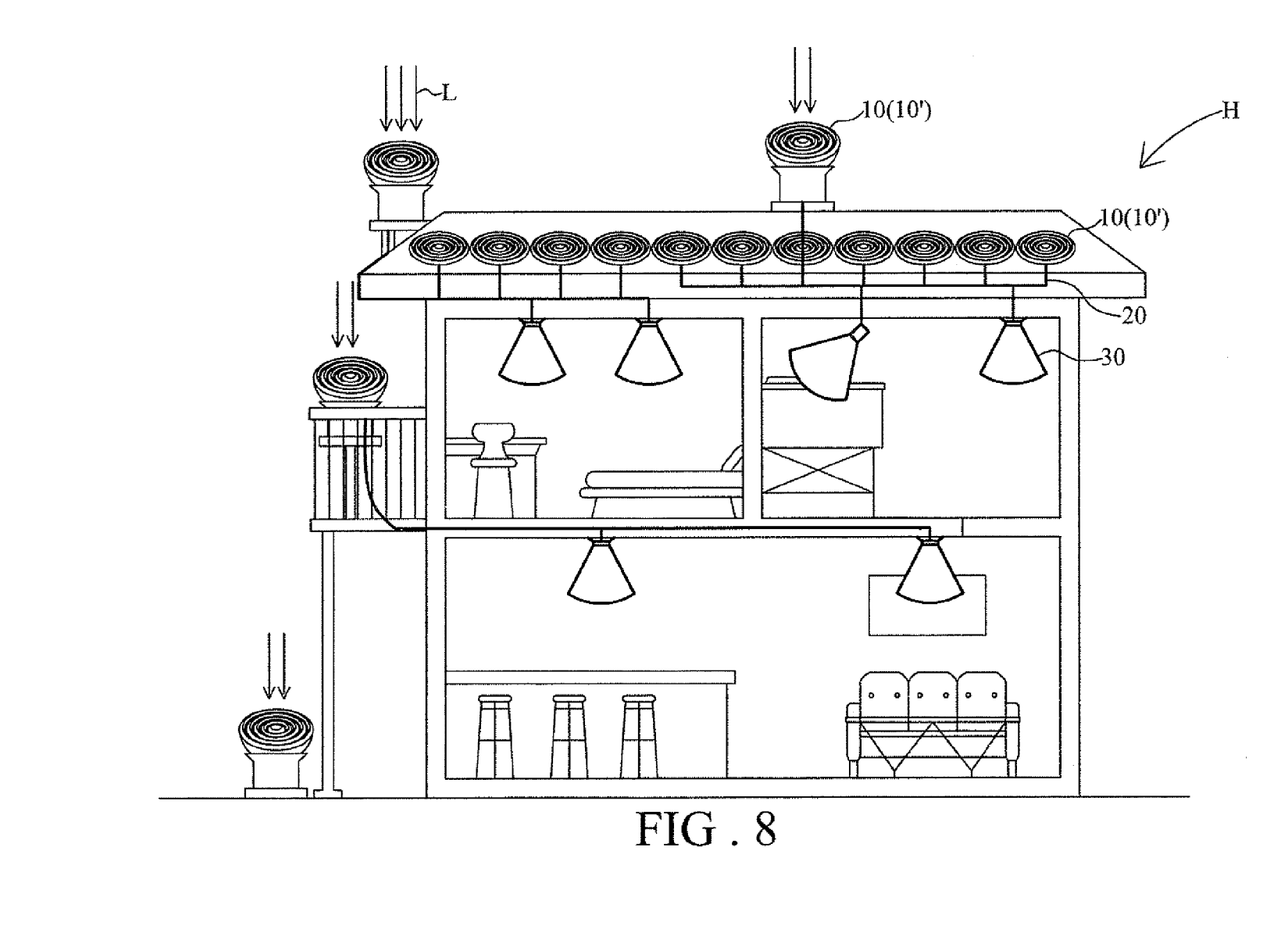
FIG. 8 is a schematic view of the light harvesting lens module of the invention disposed around a building.

Refer to FIG. 8 for a schematic view of the light harvesting lens module of the invention disposed around a building H. The light harvesting lens modules 10 and 10' are to pave the roof, the eaves and the wall of the building H, the courtyard and etc. The light beam, which is guided into the building by the light guiding unit 20, is applied in interior illumination to form a smart illumination system, or is applied in solar energy system to increase the light collection efficiency.

The design of the annular lens and the arrangement of the light harvesting lens module are to increase the light compaction efficiency, and the disc-structure of the light harvesting lens module is to improve the light collection efficiency, so as to increase the compression ratio and the light utilization efficiency. The light harvesting lens module is applied in the light illumination, the solar energy system, the related green industry, so as to get the effective advantage of the ambient light and to save energy resource.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light harvesting lens module comprising:
at a least annular lens, having a center and comprising:
a light-input curved surface, disposed in opposition to the center;
a light-output curved surface, disposed in opposition to the light-input curved surface, and facing the center, wherein a light beam is incident on the light-input curved surface, and is refracted, then the light beam is emitted from the annular lens via the light-output curved surface, and is refracted to the direction of the center by the light-output curved surface;
a reflection surface, disposed between the light-input curved surface and the light-output curved surface, connected between a side of the light-input curved surface and a side of the light-output curved surface, wherein the light beam is reflected by the reflection surface and is emitted to the direction of the center; and
a flat surface disposed in opposition to the reflection surface, and the flat surface is connected between another side of the light-input curved surface and another side of the light-output curved surface;
wherein the light-output curved surface is a protruding surface, and the flat surface has a reflection area; and
wherein the light-input curved surface has a light-input focus, and the light-input focus is disposed on the reflection area, wherein the light beam is focused on the light-input focus by the light-input curved surface and is reflected by the reflection area.

2. The light harvesting lens module of claim 1, wherein the light-output curved surface is a depression surface.

3. The light harvesting lens module of claim 1, wherein the light-output curved surface has a light-output focus, and the light-output focus and the light-input focus are in the same position, wherein the light beam focused on the light-input focus is reflected to the light-output curved surface by the reflection area.

4. The light harvesting lens module of claim 1, further comprising a light guiding unit disposed on the center for guiding the light beam emitted from the light-output curved surface.

5. The light harvesting lens module of claim 1, wherein the annular lens is plural, the radii of the annular lenses are different, so the annular lenses are arranged in order from center to outside to form a disc-structure.

6. The light harvesting lens module of claim 5, wherein the annular lenses comprise a first annular lens and a second annular lens, the first annular lens has a first light-input curved surface and a first light-output curved surface, the first light-output curved surface faces the center, the first light-input curved surface is disposed in opposition to the first light-output curved surface, the second annular lens has a second light-input curved surface and a second light-output curved surface, the second light-output curved surface faces the first light-input curved surface, and the second light-input curved surface is disposed in opposition to the second light-output curved surface.

7. The light harvesting lens module of claim 6, wherein the first light-input curved surface and the first light-output curved surface have a first focus in common, and the second light-input curved surface and the second light-output curved surface have a second focus in common, wherein the light beam focused on the second focus is reflected to the second light-output curved surface, the light beam is refracted to the first light-input curved surface by the second light-output curved surface, the light beam is refracted by the first light-input curved surface so is focused on the first focus, then the light beam is reflected to the first light-output curved surface, and is refracted by the first light-output curved surface and is emitted to the direction of the center.

* * * * *